United States Patent
Foote et al.

(10) Patent No.: US 7,260,439 B2
(45) Date of Patent: Aug. 21, 2007

(54) SYSTEMS AND METHODS FOR THE AUTOMATIC EXTRACTION OF AUDIO EXCERPTS

(75) Inventors: Jonathan T. Foote, Menlo Park, CA (US); Matthew L. Cooper, San Jose, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 874 days.

(21) Appl. No.: 09/985,073

(22) Filed: Nov. 1, 2001

(65) Prior Publication Data

US 2003/0083871 A1  May 1, 2003

(51) Int. Cl.
  *G06F 17/00* (2006.01)
(52) U.S. Cl. ...................................................... 700/94
(58) Field of Classification Search ................ 370/528; 704/215, 210; 700/94
  See application file for complete search history.

(56) References Cited

U.S. PATENT DOCUMENTS

| | | | |
|---|---|---|---|
| 5,220,565 A * | 6/1993 | Wilson et al. | 370/349 |
| 5,727,121 A * | 3/1998 | Chiba et al. | 704/214 |
| 5,870,397 A * | 2/1999 | Chauffour et al. | 370/435 |
| 5,995,153 A * | 11/1999 | Moeller et al. | 375/240.01 |
| 6,340,971 B1 * | 1/2002 | Janse et al. | 715/721 |
| 6,642,966 B1 * | 11/2003 | Limaye | 348/473 |
| 6,799,298 B2 * | 9/2004 | deVries et al. | 715/512 |
| 6,853,868 B1 * | 2/2005 | Albers et al. | 700/94 |
| 2001/0020954 A1 * | 9/2001 | Hull et al. | 345/730 |

OTHER PUBLICATIONS

I-Frame Definition from www.webopedia.com.*
Foote, "Automatic Audio Segmentation Using A Measure of Audio Novelty", FX Palo Alto Laboratory, Inc. Aug. 2, 2000.*
Foote, "Automatic Audio Segmentation Using A Measure of Audio Novetty", FX Palo Alto Laboratory, Inc. Aug. 2, 2000.*
U.S. Appl. No. 09/267,529, filed Mar. 12, 1999, Uchihachi et al.
U.S. Appl. No. 09/947,385, filed Sep. 7, 2001, Foote et al.
U.S. Appl. No. 09/569,230, filed May 11, 2000, Foote.
He et al., "Comparing Presentation Summaries: Slides vs. Reading vs. Listening", Microsoft Research.
Foote, "Automatic Audio Segmentation Using A Measure of Audio Novelty", FX Palo Alto Laboratory, Inc.
Wilcox et al., "Segmentation Of Speech Using Speaker Identification", Xerox PARC.

(Continued)

*Primary Examiner*—Sinh Tran
*Assistant Examiner*—Andrew C Flanders
(74) *Attorney, Agent, or Firm*—Sughrue Mion PLLC; Joseph Bach

(57) ABSTRACT

A method of extracting audio excerpts comprises: segmenting audio data into a plurality of audio data segments; setting a fitness criteria for the plurality of audio data segments; analyzing the plurality of audio data segments based on the fitness criteria; and selecting one of the plurality of audio data segments that satisfies the fitness criteria. In various exemplary embodiments, the method of extracting audio excerpts further comprises associating the selected one of the plurality of audio data segments with video data. In such embodiments, associating the selected one of the plurality of audio data segments with video data may comprise associating the selected one of the plurality of audio data segments with a keyframe.

18 Claims, 6 Drawing Sheets

OTHER PUBLICATIONS

Cooper et al., "Scene Boundary Detection Via Video Self-Similarity Analysis", FX Palo Alto Laboratory.

Arons, "Pitch-Based Emphasis Detection For Segmenting Speech Recordings", Proceedings of International Conference on Spoken Language Processing (Sep. 18-22, Yokohama, Japan), vol. 4, 1994, pp. 1931-1934.

Stifelman, "Augmenting Real-World Objects: A Paper-Based Audio Notebook", Speech Research Group, MIT Media Laboratory.

Chiu et al., "A Dynamic Grouping Technique for Ink and Audio Notes", FX Palo Alto Laboratory.

Kimber et al., "Acoustic Segmentation for Audio Browsers", Xerox PARC, FX Palo Alto Laboratory.

* cited by examiner

SYSTEMS AND METHODS FOR THE AUTOMATIC EXTRACTION OF AUDIO EXCERPTS

BACKGROUND OF THE INVENTION

1. Field of Invention

This invention relates to automatic extraction of audio excerpts or abstracts.

2. Description of Related Art

Practically all known techniques of audio segmentation are based on pause detection. Such techniques are not robust under noisy or reverberant conditions and are even less robust for music or non-speech audio. Speech recognition and/or speaker identification based techniques require trained statistical models. Such techniques are not robust unless the audio data resembles the training domain. Further, the computational resources required for such techniques are significant, and often impractical.

In video summary generation, some conventional video summary generators have attempted to use scene transition graphs to perform ad-hoc segmentation. The ad-hoc segmentation is then followed by a hierarchical clustering process to create a summary. Other conventional video summary generators have used closed captions, acoustic silence and pitch to determine the segment boundaries and to identify candidate segments for use in generating summaries. These conventional systems depend on determining the presence of closed captions, acoustic silence and pitch within the work and do not work well when these features are difficult to detect or missing from the work. Moreover, these conventional systems merely select a representative segment and therefore are not able to generate summaries of overly long candidate segments.

SUMMARY OF THE INVENTION

The systems and methods according to this invention provide for automatic extraction of audio excerpts. The systems and methods according to this invention also provide for automatic extraction with segmentation based on self-similarity.

Automatic extraction of audio excerpts is useful in various environments. For example, automatic extraction of audio excerpts is useful in auto/video classification and retrieval systems. A video work may be segmented and the major components of each segment determined and compared to a second similarly segmented video. Based on the granularity of the comparison, similar or substantially similar works may be identified by comparing the degree of similarity of the major components, determining the sequence and/or frequency of major component changes or by using any other means of determining similarity of the major components of the compared first and second works. Automatic extraction of audio excerpts allows keyframe video summaries to be annotated with the audio excerpts. Such audio abstracts combined with keyframes facilitates a lightweight and Web-browsable interface for auditioning video or similar media, without using bandwidth intensive streaming video or audio.

In various exemplary embodiments according to this invention, a method of extracting audio excerpts comprises: segmenting audio data into a plurality of audio data segments; setting a fitness criteria for the plurality of audio data segments; analyzing the plurality of audio data segments based on the fitness criteria; and selecting one of the plurality of audio data segments that satisfies the fitness criteria. The segmentation of audio data may be by any known or hereafter developed segmentation technique that is suitable for identifying audio segments. In various embodiments, segmenting the audio data into a plurality of audio data segments comprises segmenting the audio data based on a self-similarity analysis. The segmentation of the audio data based on a self-similarity analysis may comprise identifying novelty points in a source signal of the audio data.

In various embodiments of the method of this invention, setting a fitness criteria for the plurality of audio data segments comprises setting a duration constraint for the audio data segments and analyzing the plurality of audio data segments based on the fitness criteria comprises comparing a duration of each audio data segment to the duration constraint. In such embodiments, selecting one of the plurality of audio data segments may comprise selecting a first of the plurality of audio data segments that satisfies the duration constraint. Further, analyzing the plurality of audio data segments based on the fitness criteria may further comprise computing a fitness score for each audio data segment based on the comparison to the duration constraint. In such embodiments, selecting one of the plurality of audio data segments may comprise selecting an audio data segment having a maximum for the fitness score.

In other various embodiments of the method of this invention, setting a fitness criteria for the plurality of audio data segments comprises selecting at least one of duration, pitch contour, acoustic similarity, video features, keyframe time and associated data as a constraint for the audio data segments, and analyzing the plurality of audio data segments based on the fitness criteria comprises identifying at least one of duration, pitch contour, acoustic similarity, video features, keyframe time and associated data for each audio data segment and applying the constraint.

In various exemplary embodiments according to this invention, the method of extracting audio excerpts further comprises associating the selected one of the plurality of audio data segments with video data. In such embodiments, associating the selected one of the plurality of audio data segments with video data may comprise associating the selected one of the plurality of audio data segments with a keyframe.

In other various exemplary embodiments according to this invention, a method of extracting audio excerpts comprises: segmenting audio data into a plurality of audio data segments; setting a duration constraint for the plurality of audio data segments; comparing a duration of each audio data segment to the duration constraint; and selecting one of the plurality of audio data segments that satisfies the duration constraint. The segmentation of audio data may be by any known or hereafter developed segmentation technique that is suitable for identifying audio segments. In various embodiments, segmenting the audio data into a plurality of audio data segments comprises segmenting the audio data based on a self-similarity analysis. The segmentation of the audio data based on a self-similarity analysis may comprise identifying novelty points in a source signal of the audio data.

In various exemplary embodiments according to this invention, a system of extracting excerpts of audio data comprises: a controller; a segmentation circuit for segmenting audio data into a plurality of audio data segments; an analysis circuit for analyzing the plurality of audio data segments based on at least one fitness criteria; and a selection circuit for selecting one of the plurality of audio data segments that satisfies the fitness criteria. In various embodiments, the system further comprises an association circuit for associating the selected one of the plurality of audio data segments with video data.

In other various exemplary embodiments according to this invention, a system of extracting audio excerpts comprises: a controller; a segmentation circuit for segmenting audio data into a plurality of audio data segments; an analysis circuit for comparing a duration of each audio data segment to a duration constraint; and a selection circuit for selecting one of the plurality of audio data segments that satisfies the duration constraint. In various embodiments, the system further comprises an association circuit for associating the selected one of the plurality of audio data segments with video data.

This invention further contemplates a computer readable storage media and/or a carrier wave for carrying out the various methods of this invention.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

Figure 1:
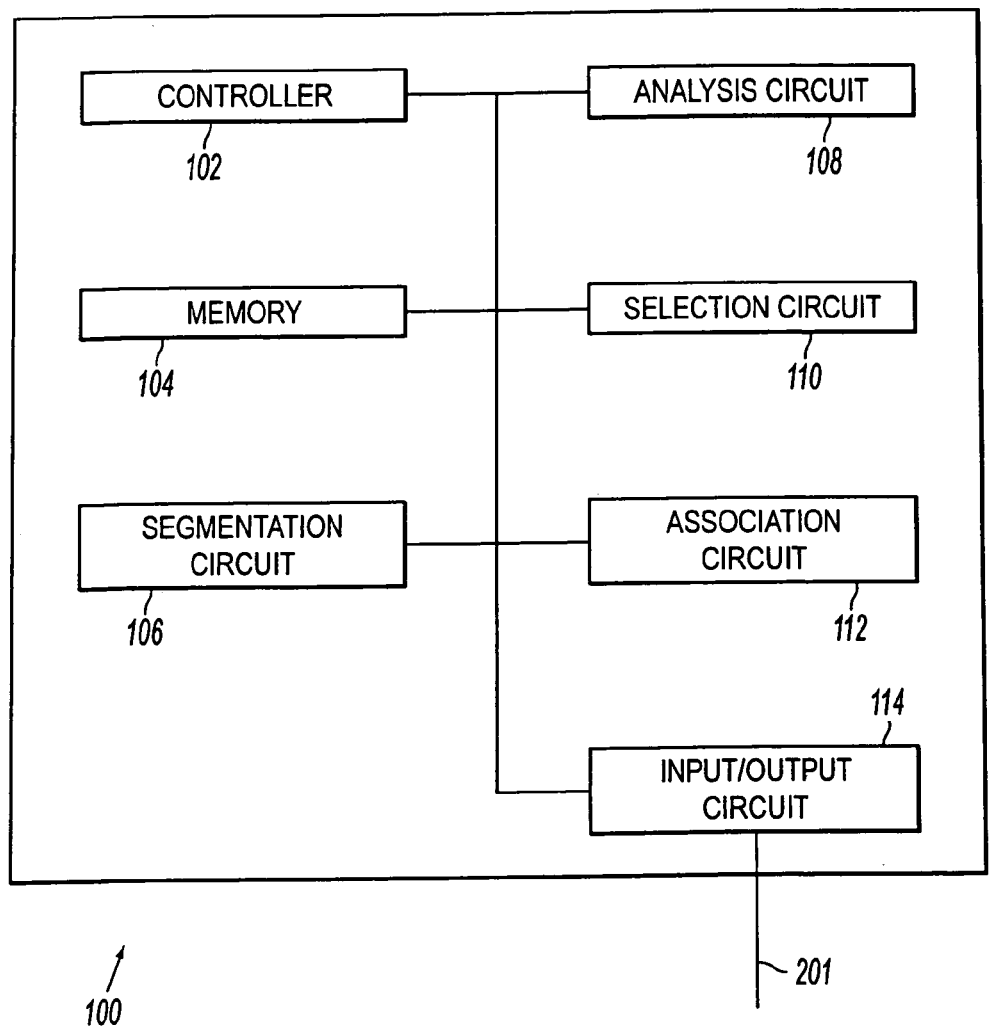
FIG. 1 shows an exemplary automatic audio extraction system according to this invention.

FIG. 1 shows an exemplary embodiment of an automatic extraction system 100 according to this invention. A controller 102; a memory 104; a segmentation circuit 106; an analysis circuit 108; a selection circuit 110; and an association circuit 112 are connected through input/output circuit 114 to communication link 201. It should be understood that the association circuit 112 is optional and may be omitted when a selected audio data segment is not associated with video data.

The controller 102 activates the input/output circuit 114 to retrieve and/or receive audio data over communication link 201. In various embodiments according to this invention, the audio data may be part of audio/video information that is encoded into a streaming audio/video protocol such as MPEG-3, MPEG-4, the PNM-RealNetworks protocol, the RealVideo protocols from RealNetworks, the Microsoft Media Streaming Protocol in the Windows Media® Player from Microsoft Corporation or any other known or later developed audio and/or audio/video protocol. The various embodiments according to this invention also contemplate operating upon MPEG-4 or any other encoded information to directly access the encoded information stream or protocol without requiring separate decoding and encoding.

The retrieved and/or received audio data may be raw audio data or may be audio data that has already been subjected to coarse segmentation. Coarse segmentation may be achieved using any suitable technique, either known or hereafter developed. For example, when the audio data are part of audio/video data, coarse segmentation may be based on color histogram analysis of the video data as described in copending U.S. application Ser. No. 09/267,529, filed Mar. 12, 1999, subsequently issued as U.S. Pat. No. 6,535,639 on Mar. 18, 2003, which is incorporated herein by reference.

The retrieved and/or received audio data is stored in memory 104. The segmentation circuit 106 is then activated to identify a plurality of audio data segments of the retrieved and/or received audio data. For example, candidate segment boundaries may be identified that define various audio data segments. The segmentation circuit 106 may implement any known or hereafter developed segmentation technique that is suitable for segmenting audio data.

In various exemplary embodiments of this invention, the segmentation circuit 106 may implement segmentation of the audio data that are based on a self-similarity analysis. For example, the segmentation circuit 106 may implement segmentation wherein the self-similarity analysis comprises identifying novelty points in a source signal of the audio data. Such a segmentation technique is described in copending U.S. application Ser. No. 09/569,230, filed May 11, 2000, subsequently issued as U.S. Pat. No. 6,542,869 on Apr. 1, 2003, which is incorporated herein by reference.

Figure 2:
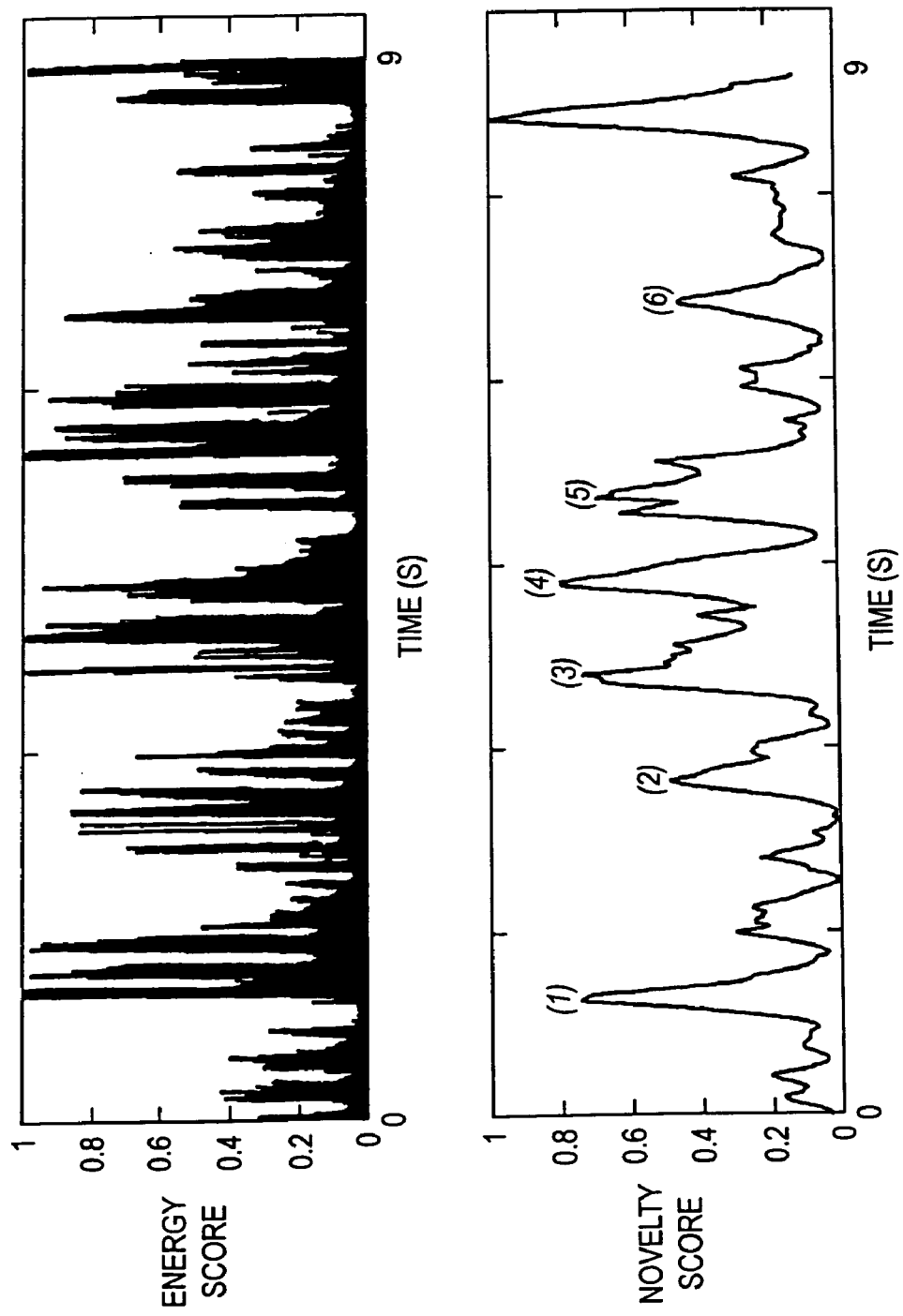
FIG. 2 shows illustrative graphs of energy and novelty scores for 9 seconds of audio data.

This self-similarity segmentation technique offers advantages over other techniques that are not robust under noisy or reverberant conditions or adapted for music or other non-speech audio data. Further, no statistical modeling and relatively little computations are required for this technique. FIG. 2 shows illustrative graphs of energy and novelty scores for 9 seconds of audio data. The peaks or maxima in the novelty score provide excellent candidate segment boundaries because the audio data will be self-similar between maxima and significantly different across them. Further, because the novelty score is a non-linear measure, the novelty score produces sharp and distinct peaks or maxima even when calculated over a relatively large time interval. In comparison, techniques using average energy result in less distinct peaks for relatively large time intervals.

As shown in FIG. 2, the peaks or maxima in the novelty score occur at longer time intervals than the peaks in the energy score. Thus, the novelty score yields fewer candidate boundaries to consider. If the energy score is low-pass filtered to reduce the number of peaks, shallower peaks that are more difficult to detect and a reduction in time resolution will result.

Using a self-similarity segmentation technique, the candidate segment boundaries are selected from the peaks in the novelty score. Selection may be, for example, based on identifying points where the novelty score exceeds a local or global threshold. For more time precision, the peaks may be located exactly by identifying the maxima or zero-slope points above the threshold. The peaks may then be ranked by height for selection of only the highest peaks. This effectively results in a variable threshold so that the segmentation method is robust for all types of audio data, including audio data with noise or only modest variation.

Once the candidate segment boundaries are identified or selected, the analysis circuit 108 evaluates the corresponding audio data segments based on a temporal analysis and/or a fitness analysis. In the case of a temporal analysis, the analysis circuit 108 evaluates the corresponding audio data segments according to a duration constraint. For example, each identified or selected candidate segment boundary may be considered to be the start boundary of a corresponding audio data segment. A duration constraint may be set so that the candidate audio data segments are not too long or too short for a given application. For example, a range of five to fifteen seconds may be used as the duration constraint. Each start/end combination of candidate segment boundaries is compared to the duration constraint by the analysis circuit 108.

In the case of a fitness analysis, the analysis circuit 108 evaluates the corresponding audio data segments according to at least one fitness criteria. When the analysis circuit 108 performs a temporal analysis, the fitness criteria may be the first audio data segment that satisfies the duration constraint. Alternatively, the fitness criteria may be the audio data segment that is closest to a preferred duration within the duration constraint. For example, the analysis circuit 108 may generate a ranking of the candidate audio data segments based on their deviation from the preferred duration.

The fitness criteria may also be an energy criteria. For example, the analysis circuit 108 may evaluate the average energy of each candidate audio data segment. An energy criteria may be used to ensure that candidate audio data segments that consist solely of silence or background noise are disfavored and not selected. Furthermore, the analysis circuit 108 may evaluate each candidate audio data segment based on the energy of adjacent candidate audio data segments so that audio data segments that are more likely to be entire phrases, sounds, notes and the like are favored.

The analysis circuit 108 may evaluate and rank each candidate audio data segment based on one or more fitness criteria. Other non-limiting examples of fitness criteria that may be used include the pitch contour of the candidate audio data segments for identifying speech emphasis and acoustic similarity of the candidate audio data segments for identifying particular audio characteristics.

When the audio data is associated with video data, particular video image features corresponding to the candidate audio data segments may be used as a fitness criteria. For example, a face detection algorithm may be used to identify candidate audio data segments more likely to contain speech. Also, when the audio data segments are to be associated with a video keyframe, a keyframe time may be used as a fitness criteria, for example, evaluating whether the keyframe time occurs during the candidate audio data segments or how near the start boundary of each audio data segment is to the keyframe time.

The candidate audio data segments may also be evaluated by the analysis circuit 108 for fitness criteria based on other data sources. For example, time-stamped annotations, captions or subtitle data, graphics data or any other suitable data source that may be associated with the audio data.

Based on the fitness criteria, the analysis circuit 108 may generate a fitness score for each candidate audio data segment. The fitness score may represent a measure of how well each candidate audio data segment satisfies the fitness criteria. The selection circuit 110 is then used to select one of the candidate audio data segments, for example, based on the fitness scores.

Once an audio data segment is selected by the selection circuit 110, the association circuit 112 may associate the selected audio data segment with video data. For example, the association circuit 112 may associate the selected audio data segment with a keyframe for use in a multimedia document.

Figure 3:
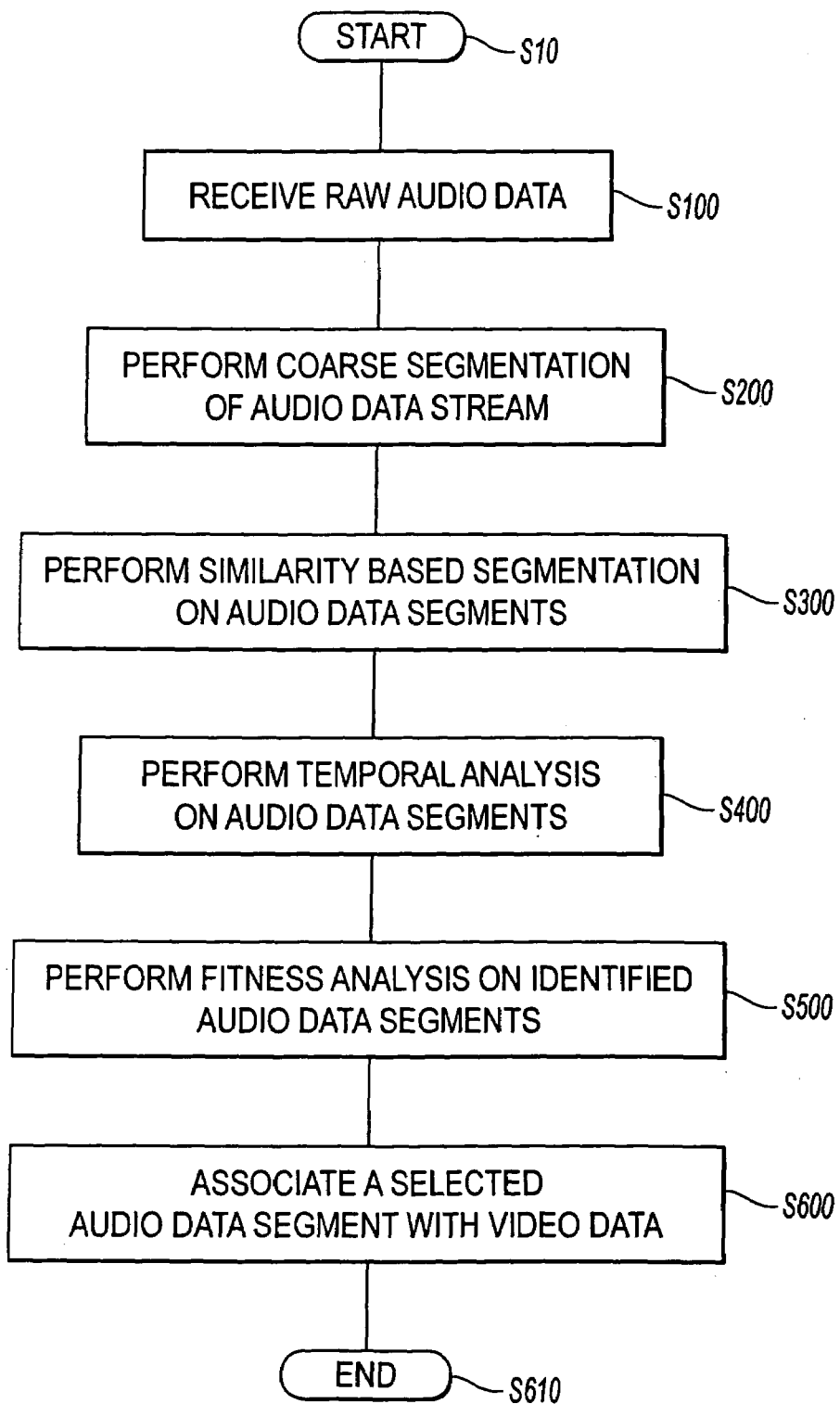
FIG. 3 is a flowchart of an exemplary method of automatic audio extraction according to this invention.
Figure 4:
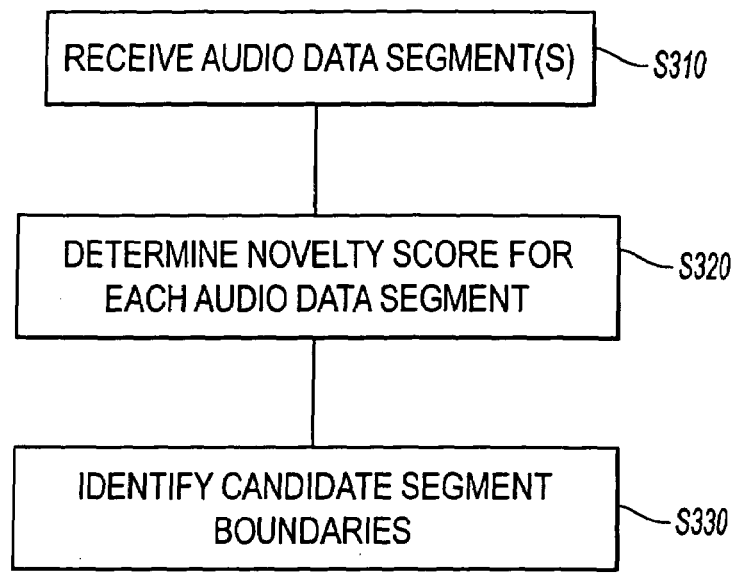
FIG. 4 is a flowchart of an exemplary method of similarity based segmentation according to this invention.
Figure 5:
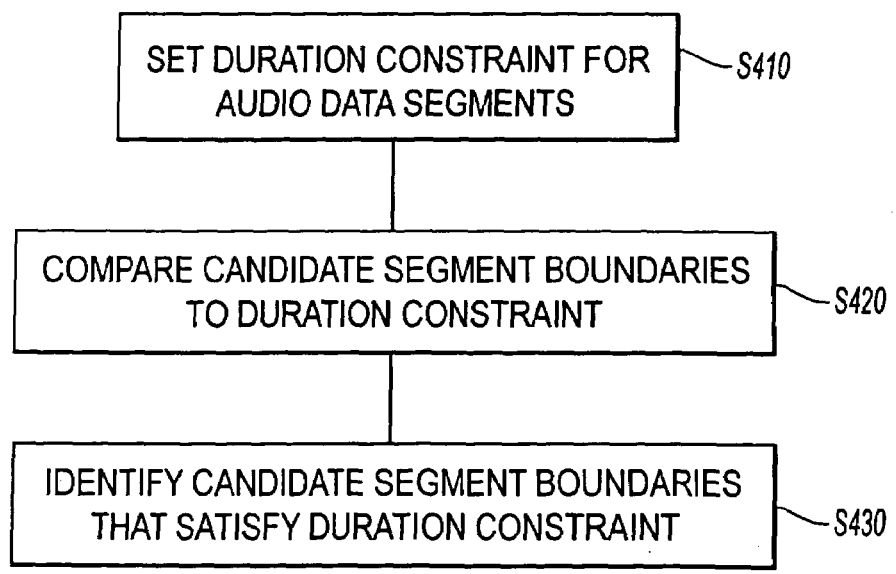
FIG. 5 is a flowchart of an exemplary method of temporal analysis according to this invention.
Figure 6:
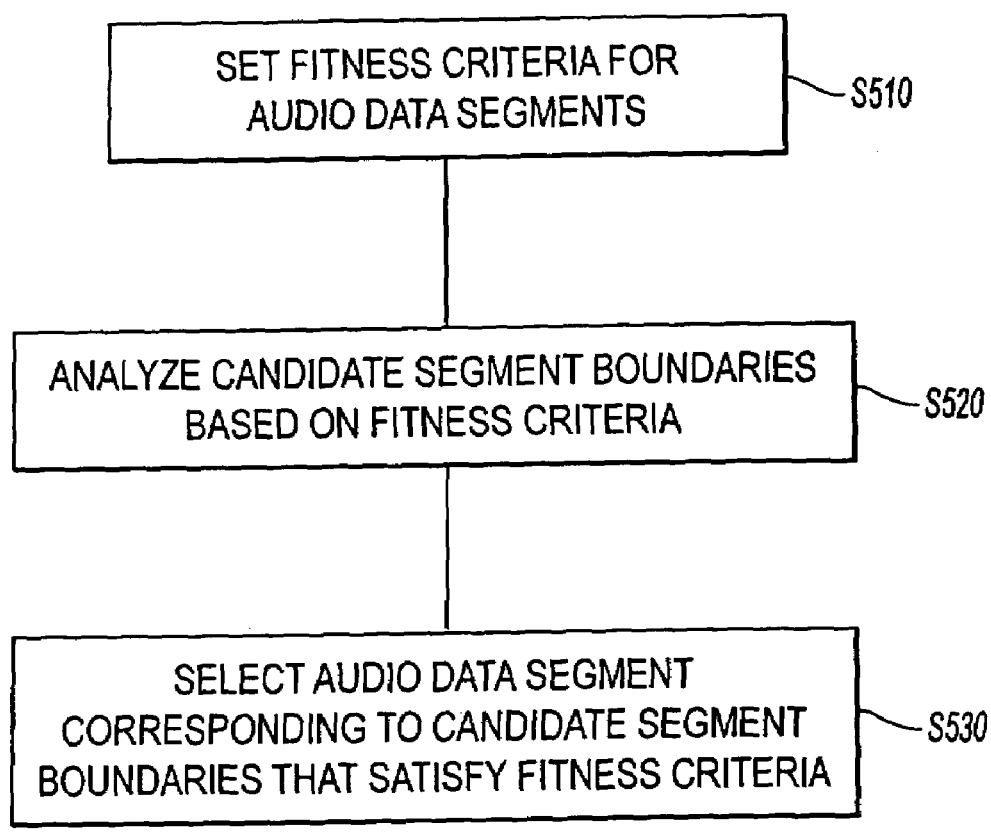
FIG. 6 is a flowchart of an exemplary method of fitness analysis according to this invention.

FIG. 3-6 are flowcharts illustrating an exemplary method of automatic audio extraction according to this invention. As described below, FIG. 3 is a flowchart of the exemplary method and FIGS. 4-6 are flowcharts illustrating various steps of the method in more detail.

As shown in FIG. 3, the process begins at step S10 and immediately continues to step S100. In step S100, raw audio data is received. Then, in step S200, the raw audio data is subjected to a coarse segmentation technique. As noted above, the coarse segmentation technique may be any known or hereafter developed technique for segmenting audio data. Also, it should be understood that the coarse segmentation of step S200 is optional and the raw audio data received in step S100 may be unsegmented prior to step S300.

In step S300, a similarity based segmentation is performed on the raw audio data or the audio data segments from the coarse segmentation. For the reasons noted above, this technique may preferred over other segmentation techniques. However, it should be understood that this invention is not limited to a method involving similarity based segmentation, but rather that other segmentation techniques, either known or hereafter developed, may be used.

In the exemplary method, a temporal analysis is performed on the audio data segments in step S400 to identify candidate audio data segments. Then, in step S500, the identified candidate audio data segments are subjected to a fitness analysis. It should be understood, based on the above description of the exemplary system, that step S400 may be the only analysis needed for a given application. Similarly, the temporal analysis of step S400 may be omitted so that the only analysis is the fitness analysis of step S500. Further, it should be understood that the temporal analysis of step S400 may be included in the fitness analysis of step S500.

Based on the fitness analysis of step S500, a selected audio data segment is then associated with video data in step S600. As described above, in a preferred embodiment, the video data comprises a keyframe for use in a multimedia document. Control then continues to step S610 where the process ends.

As shown in FIG. 4, step S300 may comprise steps S310, S320 and S330. When the audio data is subjected to coarse segmentation such that audio data segments are received in step S310, steps S310, S320 and S330 may be executed as a loop to process each of the segments in turn. Otherwise, when raw audio data or only a single segment is received in step S310, steps S310, S320 and S330 are executed in order as shown. Once the audio data segment is received in step S310, a novelty score is determined for the segment in step S320. The novelty score is then used in step S330 to identify candidate segment boundaries, as described above.

As shown in FIG. 5, step S400 may comprise steps S410, S420 and S430. In step S410, a duration constraint is set for the audio data segments. The duration constraint may be manually set by input from a user or may be automatically set, for example, based on the type or characteristics of the audio data received in step S100. In step S420, the candidate segment boundaries are compared to the duration constraint. Then, in step S430, candidate segment boundaries that satisfy the duration constraint are identified.

As shown in FIG. 6, step S500 may comprise steps S510, S520 and S530. In step S510, a fitness criteria is set for the audio data segments. The fitness criteria may be manually set by input from a user or may be automatically set, for example, based on the type or characteristics of the audio data received in step S100. In step S520, the candidate segment boundaries are analyzed based on the fitness criteria. Then, in step S530, one of the audio data segments is selected that corresponds to the candidate segment boundaries that satisfy the fitness criteria.

Figure 7:
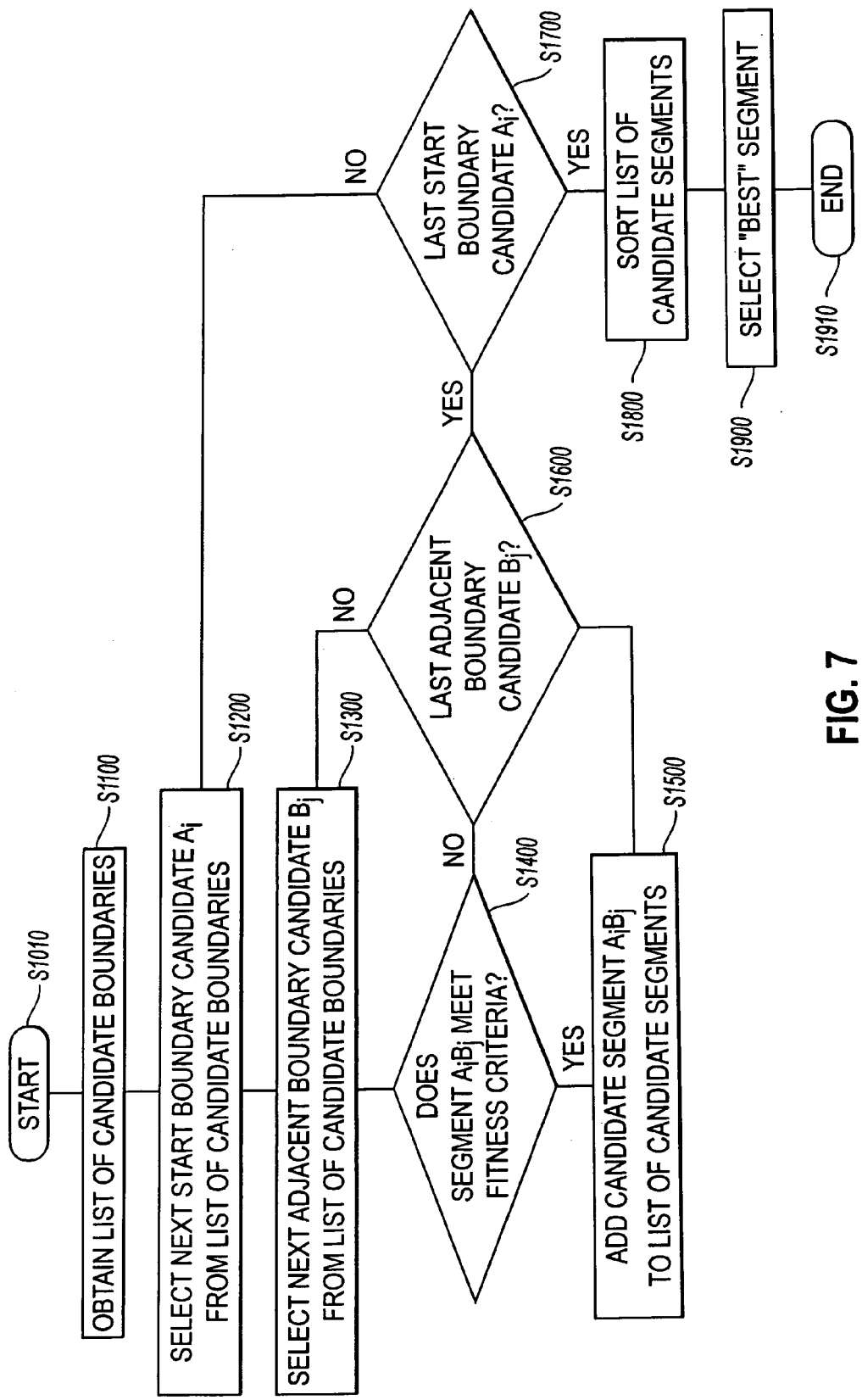
FIG. 7 is a flowchart of an exemplary method of segment selection according to this invention.

FIG. 7 is a flowchart illustrating an exemplary method of segment selection according to this invention. The process begins at step S1010 and immediately continues to step S1100. In step S1100, a list of candidate boundaries is obtained. The list of candidate boundaries may be determined using the novelty score. As shown in FIG. 2, candidate boundaries 1-6 may be selected based on novelty score criteria.

Next, in step S1200, one of the candidate boundaries is selected from the list of candidate boundaries as a start boundary candidate $A_i$. This may be done in time order, such that candidate boundary 1 in FIG. 2 would be selected as the first start boundary candidate. In step S1300, the next adjacent boundary candidate $B_j$ is selected from the list of candidate boundaries to define a candidate segment $A_iB_j$. Then, in step S1400, the candidate segment $A_iB_j$ is analyzed for or compared to a desired fitness criteria. If the candidate segment $A_iB_j$ meets the fitness criteria, control proceeds to step S1500, where the candidate segment $A_iB_j$ is added to a list of candidate segments. Control continues to step S1600. If the candidate segment $A_iB_j$ does not meet the fitness criteria, control jumps to step S1600.

In step S1600, a determination is made whether there is another adjacent boundary candidate $B_j$ or if the last adjacent boundary candidate $B_j$ has been selected. If another adjacent boundary candidate $B_j$ exists, control returns to step S1300. If the boundary candidate $B_j$ was the last, control proceeds to step S1700.

In step S1700, a determination is made whether there is another start boundary candidate $A_i$ or if the last start boundary candidate $A_i$ has been selected. If another start boundary candidate $A_i$ exists, control returns to step S1200. If the start boundary candidate $A_i$ was the last, control proceeds to step S1800. In this manner, every combination of candidate boundaries from the list is evaluated. For example, for the list of candidate boundaries 1-6 shown in FIG. 2, candidate segments (1-2), (1-3), (1-4), (1-5), (1-6), (2-3), (2-4), (2-5), (2-6), (3-4), (3-5), (3-6), (4-5), (4-6) and (5-6) are evaluated.

In step S1800, the list of candidate segments may be sorted, for example, ranked by fitness score. The sorting may or may not be based on the same fitness criteria used to evaluate candidate segments in step S1400. Then, in step S1900, the best candidate segment is selected from the sorted list of candidate segments. The "best" candidate segment may depend on user preferences and/or the particular application for the extracted audio segment. Control then continues to step S1910 where the process ends.

In the various exemplary embodiments outlined above, the automatic audio extraction system 100 can be implemented using a programmed general purpose computer. However, the automatic audio extraction system 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3-6 and 7 can be used to implement the automatic audio extraction system 100.

Each of the circuits 102-114 of the automatic audio extraction system 100 outlined above can be implemented as portions of a suitably programmed general purpose computer. Alternatively, circuits 102-114 of the automatic audio extraction system 100 outlined above can be implemented as physically distinct hardware circuits within an ASIC, or using a FPGA, a PDL, a PLA or a PAL, or using discrete logic elements or discrete circuit elements. The particular form each of the circuits 102-114 of the automatic audio extraction system 100 outlined above will take is a design choice and will be obvious and predicable to those skilled in the art.

Moreover, the automatic audio extraction system 100 and/or each of the various circuits discussed above can each be implemented as software routines, managers or objects executing on a programmed general purpose computer, a special purpose computer, a microprocessor or the like. In this case, the automatic audio extraction system 100 and/or each of the various circuits discussed above can each be implemented as one or more routines embedded in the communications network, as a resource residing on a server, or the like. The automatic audio extraction system 100 and the various circuits discussed above can also be implemented by physically incorporating the automatic audio extraction system 100 into a software and/or hardware system, such as the hardware and software systems of a web server.

As shown in FIG. 1, the memory 104 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication link 201 shown in FIG. 1 can be any known or later developed device or system for connecting a communication device to the automatic audio extraction system 100, including a direct cable connection, a connection over a wide area network or a local area network, a connection over an intranet, a connection over the Internet, or a connection over any other distributed processing network or system. In general, the communication link 201 can be any known or later developed connection system or structure usable to connect devices and facilitate communication.

Further, it should be appreciated that the communication link 201 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of extracting an audio excerpt, comprising:
   segmenting audio data into a plurality of audio data segments, including:
      performing a coarse segmentation to produce the plurality of audio data segments, determining a novelty score for each audio data segment of the plurality of audio data segments to produce novelty scores, and identifying candidate segment boundaries based on the novelty scores to segment the plurality of audio data segments;

setting a fitness criteria for the plurality of audio data segments;

analyzing the plurality of audio data segments based on comparing the candidate segment boundaries to the fitness criteria;

selecting one of the plurality of audio data segments that satisfies the fitness criteria;

associating the selected one audio data segment with a keyframe video summary; and, providing an interface enabling user browsing of audio data segments associated with keyframe video summaries.

2. The method of claim 1, wherein segmenting the audio data into a plurality of audio data segments comprises segmenting the audio data based on a self-similarity analysis.

3. The method of claim 2, wherein segmenting the audio data based on a self-similarity analysis comprises identifying novelty points in a source signal of the audio data.

4. The method of claim 1, wherein:

setting a fitness criteria for the plurality of audio data segments comprises setting a duration constraint for the audio data segments; and analyzing the plurality of audio data segments based on the fitness criteria comprises comparing a duration of each audio data segment to the duration constraint.

5. The method of claim 4, wherein selecting one of the plurality of audio data segments comprises selecting a first of the plurality of audio data segments that satisfies the duration constraint.

6. The method of claim 4, wherein analyzing the plurality of audio data segments based on the fitness criteria further comprises computing a fitness score for each audio data segment based on the comparison to the duration constraint.

7. The method of claim 6, wherein selecting one of the plurality of audio data segments comprises selecting an audio data segment having a maximum for the fitness score.

8. The method of claim 1, wherein:

setting a fitness criteria forte plurality of audio data segments comprises selecting at least one of duration, pitch contour, acoustic similarity, video features, keyframe time and associated data as a constraint for the audio data segments; and analyzing the plurality of audio data segments based on the fitness criteria comprises identifying at least one of duration, pitch contour, acoustic similarity, video features, keyframe time and associated data for each audio data segment and applying the constraint.

9. A method of extracting an audio excerpt, comprising:

segmenting audio data into a plurality of audio data segments, including:

performing a coarse segmentation to produce the plurality of audio data segments, determining a novelty score for each audio data segment of the plurality of audio data segments, and identifying a duration of each audio data segment based on the novelty score;

setting a duration constraint for the plurality of audio data segments;

comparing the duration of each audio data segment to the duration constraint selecting one of the plurality of audio data segments that satisfies the duration constraint; and associating the selected one audio data segment with a keyframe video summary.

10. The method of claim 9, wherein segmenting the audio data into a plurality of audio data segments comprises segmenting the audio data based on a self-similarity analysis.

11. The method of claim 10, wherein segmenting the audio data based on a self-similarity analysis comprises identifying novelty points in a source signal of the audio data.

12. The method of claim 9, wherein selecting one of the plurality of audio data segments comprises selecting a first of the plurality of audio data segments that satisfies the duration constraint.

13. The method of claim 9, further comprising computing a fitness score for each audio data segment based on the comparison to the duration constraint.

14. The method of claim 13, wherein selecting one of the plurality of audio data segments comprises selecting an audio data segment having a maximum for the fitness score.

15. A system of extracting an excerpt of audio data, comprising:

a controller;

a segmentation circuit for segmenting audio data into a plurality of audio data segments by performing a coarse segmentation to produce the plurality of audio data segments, determining a novelty score for each audio data segment of the plurality of audio data segments to produce novelty scores, and identifying candidate segment boundaries based on the novelty scores to segment the plurality of audio data segments;

an analysis circuit for analyzing the plurality of audio data segments based on comparing the candidate segment boundaries to at least one fitness criteria;

a selection circuit for selecting one of the plurality of audio data segments that satisfies the fitness criteria; and an association circuit for associating the selected audio data segment with a keyframe video summary.

16. A system of extracting an audio excerpt, comprising:

a controller;

a segmentation circuit for segmenting audio data into a plurality of audio data segments by performing a coarse segmentation to produce the plurality of audio data segments, determining a novelty score for each audio data segment of the plurality of audio data segments, and identifying a duration of each audio data segment based on the novelty score;

an analysis circuit for comparing the duration of each audio data segment to a duration constraint;

a selection circuit for selecting one of the plurality of audio data segments that satisfies the duration constraint; and an association circuit for associating the selected one audio data segment with a keyframe video summary.

17. A computer readable storage medium, comprising:

computer readable program code embodied on the computer readable storage medium, the computer readable program code usable to program a computer to perform a method of extracting an audio excerpt, comprising:

segmenting audio data into a plurality of audio data segments, including:

performing a coarse segmentation to produce the plurality of audio data segments, determining a novelty score for each audio data segment of the plurality of audio data segments to produce novelty scores, and identifying candidate segment boundaries based on the novelty scores to segment the plurality of audio data segments;

setting a fitness criteria for the plurality of audio data segments;

analyzing the plurality of audio data segments based on comparing the candidate segment boundaries to the fitness criteria;

selecting one of the plurality of audio data segments that satisfies the fitness criteria; and associating the selected one audio data segment with a keyframe video summary.

18. A computer readable storage medium, comprising:

computer readable program code embodied on the computer readable storage medium, the computer readable program code usable to program a computer to perform a method of extracting an audio excerpt, comprising:

segmenting audio data into a plurality of audio data segments, including:

performing a coarse segmentation to produce the plurality of audio data segments, determining a novelty score for each audio data segment of the plurality of audio data segments, and identifying a duration of each audio data segment based on the novelty score;

setting a duration constraint for the plurality of audio data segments;

comparing the duration of each audio data segment to the duration constraint;

selecting one of the plurality of audio data segments that satisfies the duration constraint; and associating the selected one audio data segment with a keyframe video summary.

* * * * *